UNITED STATES PATENT OFFICE.

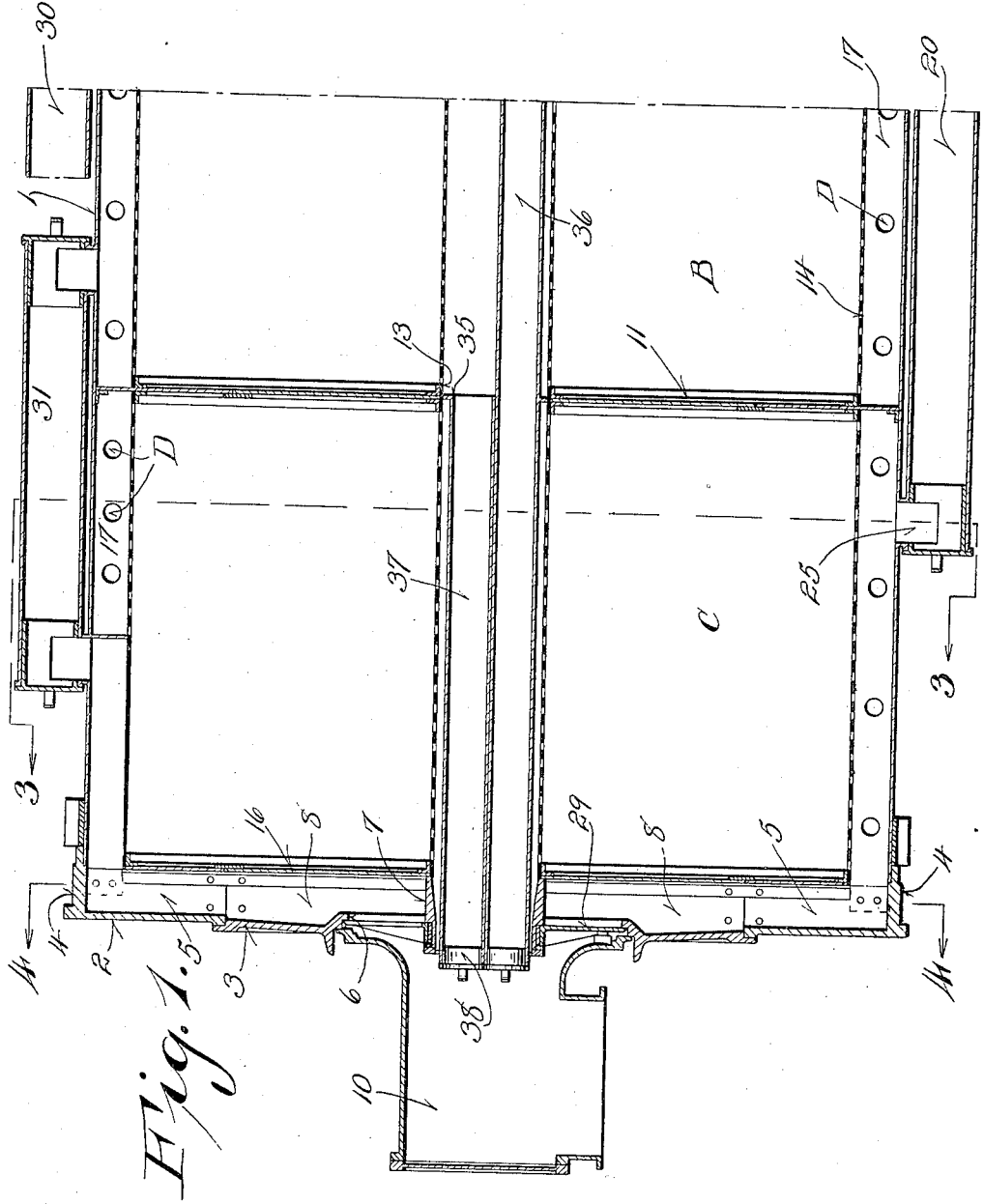

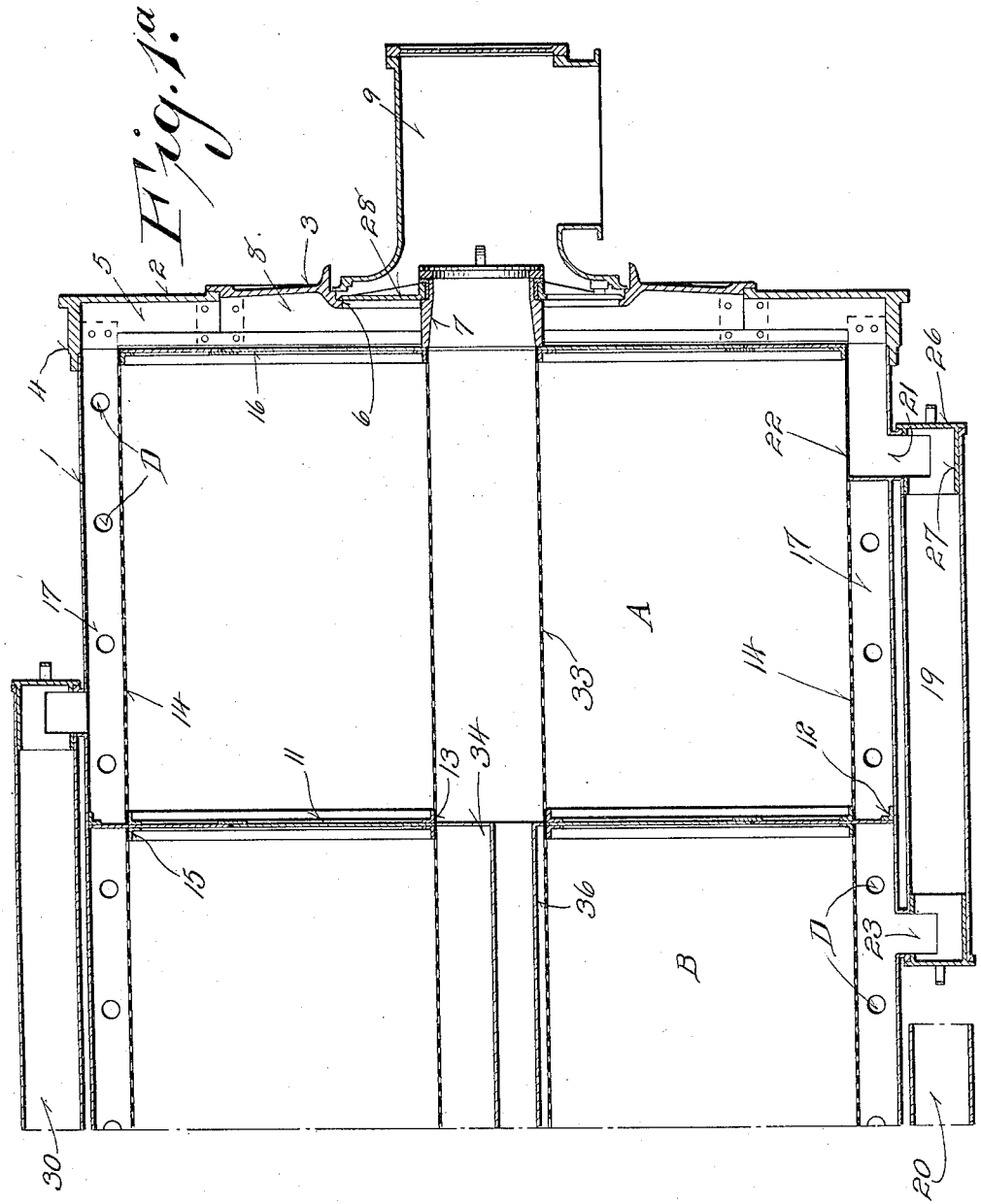

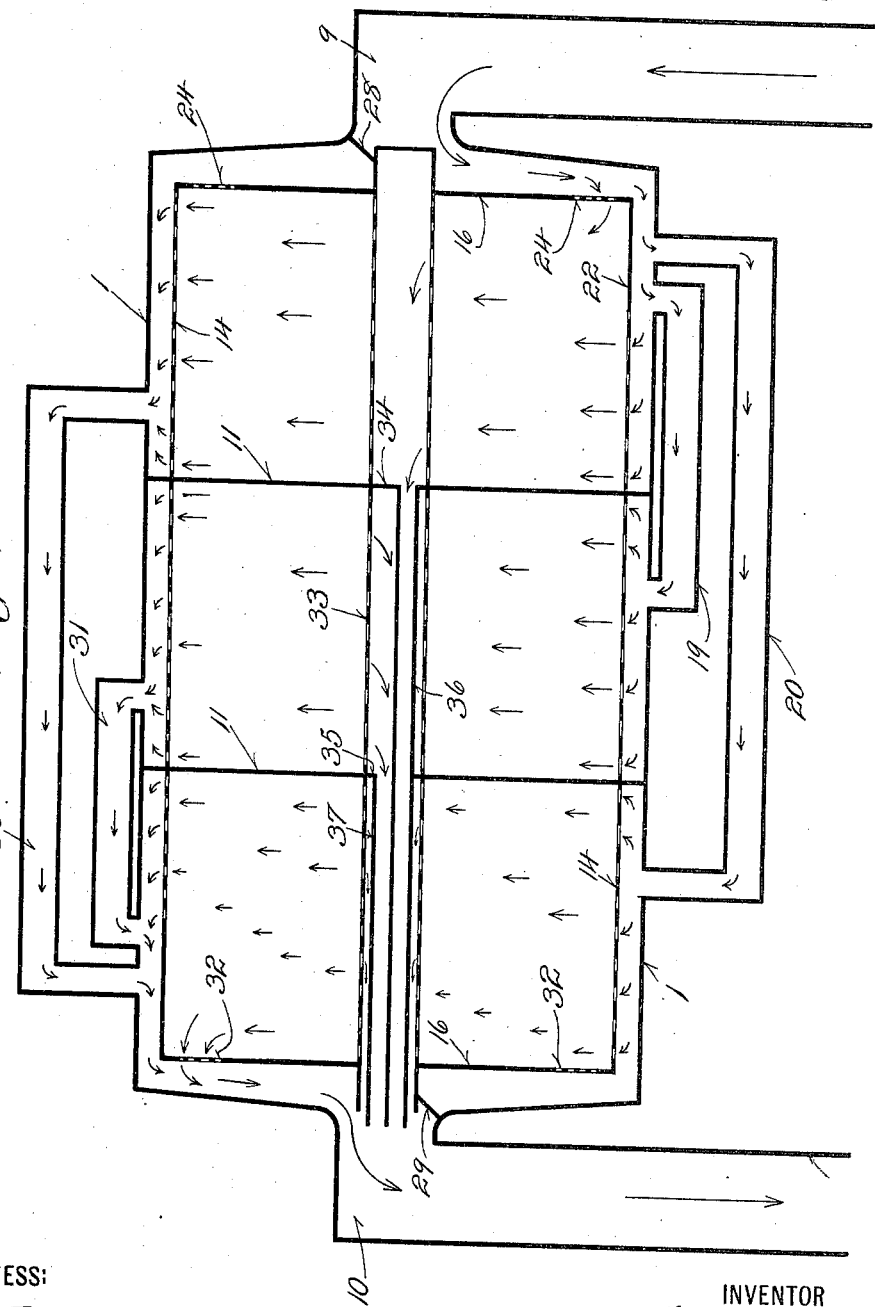

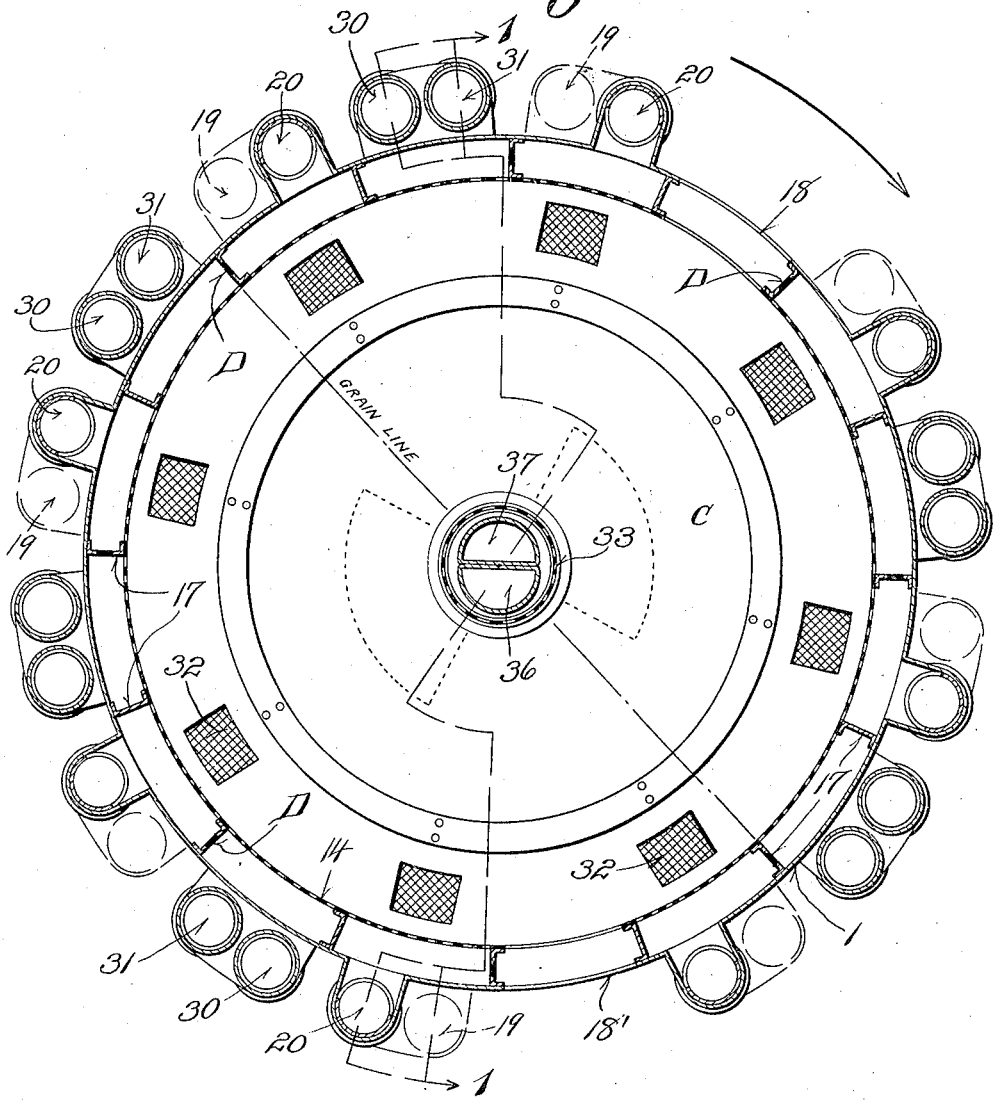

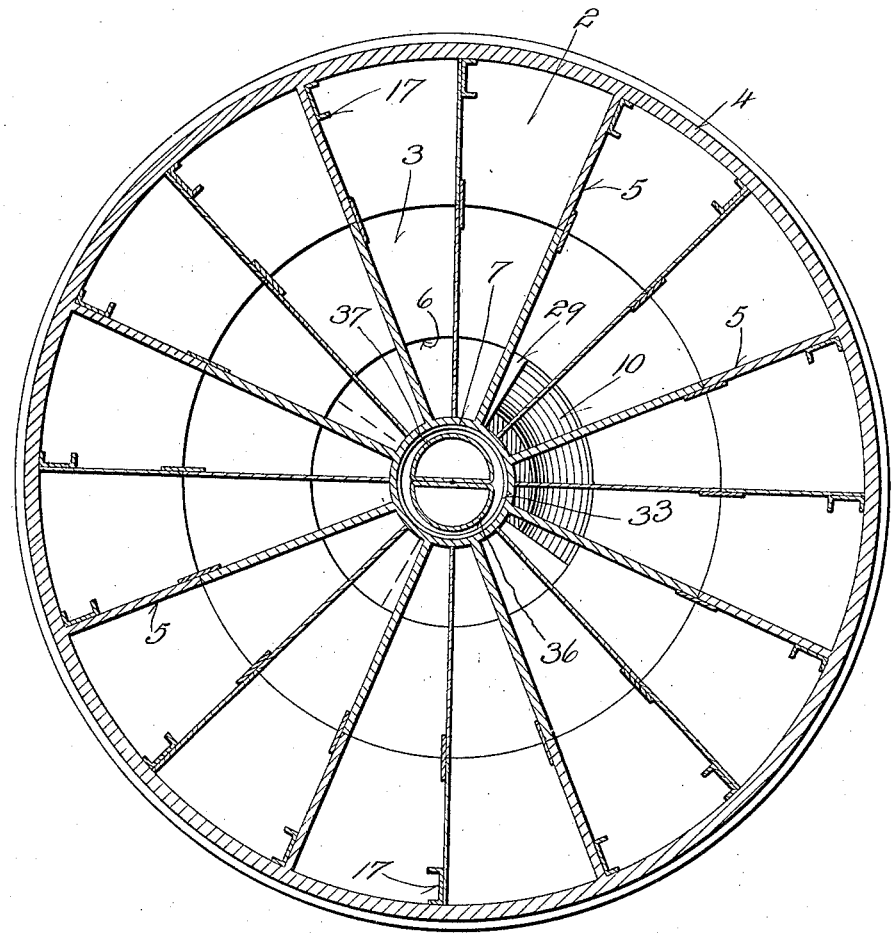

WILLIAM A. PETERMAN, OF MILWAUKEE, WISCONSIN, ASSIGNOR TO GALLAND-HENNING PNEUMATIC MALTING DRUM MFG. COMPANY, OF MILWAUKEE, WISCONSIN.

MALTING-DRUM.

1,316,643.  Specification of Letters Patent.  Patented Sept. 23, 1919.

Application filed May 21, 1918. Serial No. 235,840.

*To all whom it may concern:*

Be it known that I, WILLIAM A. PETERMAN, a citizen of the United States, and resident of Milwaukee, in the county of Milwaukee and State of Wisconsin, have invented certain new and useful Improvements in Malting-Drums; and I do hereby declare that the following is a full, clear, and exact description thereof.

My invention relates to new and useful improvements in an apparatus for treating grains and other materials such as that illustrated in United States Patent No. 1,025,263, and granted May 7, 1912 to Franklin B. Giesler.

In the apparatus illustrated in said patent it is designed to treat approximately three hundred (300) bushels of grain or like material at one charging. It is frequently desirable to malt a smaller quantity of material but such is not practical in an apparatus of such size; furthermore smaller machines are not so efficient in operation even though it is possible to build the same for smaller quantities of material to be treated. It is therefore the object of the present invention to produce a machine of large size provided with a plurality of compartments in each of which approximately one hundred (100) bushels of grain or like material may be malted. Such an apparatus will combine the efficiency of the larger machine with the practicability of one of smaller size. Incidentally with a machine constructed in accordance with the present invention one or more of the compartments may be emptied of its contents while in the others the malting processes are being continued.

An additional object of the invention is to provide an arrangement of air passageways which can be readily controlled to regulate the quantity of air passing therethrough into the malting chambers or compartments.

With these and other objects in view the invention resides in the novel features of construction, combination and arrangement of parts which will be hereinafter more particularly described and claimed and shown in the drawings in which:—

Figure 1 represents a vertical sectional view of the air discharge end of a rotary pneumatic type of malting drum.

Fig. 1ª is a similar view of the air supply end of the apparatus, this and the preceding figure being cut approximately of the plane of the line 1—1 of Fig. 3.

Fig. 2 is a diagrammatic view showing the direction of the air currents within the apparatus, and Figs. 3 and 4 are vertical transverse sectional views taken substantially on the planes of the lines 3—3 and 4—4 of Fig. 1.

In the accompanying drawings I have illustrated the invention as applied to a rotary pneumatic type of malting drum one form of which is shown in the foregoing United States patent. This drum may be cradled and driven by any desired form of mechanism such as is common in the art. Such drum includes the outer non-perforated shell 1, the ends of which are partially closed by end rings 2 and spider plates 3. The end rings have laterally extending flanges 4 by which the ends of the shell 1 are secured thereto, and from the inner surface of the rings extend regularly spaced webs 5.

The spider plates 3 each have a central circular opening 6 and concentric with the wall thereof is an annular hub 7, the same being held in position by inwardly extending radial webs 8 formed integrally therewith and with the inner surface of the plate. In assembling the end rings and the spider plates, the inner ends of the webs of the former are alined with the outer ends of the webs of the latter and secured thereto in any desired manner. The opening in the spider plate in one end of the drum communicates with a stationary air supply flue 9; similarly positioned at the opposite end is a stationary exhaust flue 10.

The non-perforated inclosing shell 1, which in the present instance is preferably cylindrical, is transversely divided into a number of compartments by means of partition plates 11, the peripheries of the same being secured to the inner wall of the shell by the aid of angle metal rings 12. Each of the partition plates is provided with a central opening 13 for a purpose to be hereinafter more particularly explained.

Also positioned within the outer shell 1 is an inner perforated shell 14, the same being split into a number of sections which are secured to the partition plates 13 by means of angle metal rings 15. The inner shell 14 is of small diameter than the other shell 1 whereby to provide an annular air space between the same; radial air spaces are defined at the ends of the inner shell 14 between end walls 16, the webs 5 and 8, the end rings 2 and the spider plates 3. For the purpose of spacing the shells 1 and 14 apart and also to divide the annular space therebetween into a plurality of longitudinally extending air spaces, I dispose a plurality of equally spaced channel bars 17 therebetween, said bars being secured at the opposite ends to the webs 5 of the end rings 2.

In the present instance the malting drum is divided into three compartments which, for convenience in description will be designated by the characters A, B and C reading from the air supply end of the apparatus. Each of these compartments is provided with suitably closed intake and discharge door-ways 18 and 18' whereby grain or the like may be inserted and removed. Inasmuch as it is desirable that the material in each of the compartments be treated to the same degree, equal quantities of air are directed from the air supply flue 9 to each of the compartments. In carrying out this equal distribution of air a plurality of air delivery passage-ways 19 and 20 are located externally of the outer shell 1 and secured thereto. From the drawings it will be noted that the passage-ways 19 are considerably shorter than the passage-ways 20 inasmuch as the former convey air only from the supply end of the apparatus to the compartment B, whereas the latter conduct the air from said supply end to the compartment C.

The passage-ways 19 have one end opening through the wall of the shell 1 as at 21 into certain of the longitudinal air spaces defined by the channel bars 17 adjacent the compartment A, the wall 14 thereof being without perforations at this point as indicated at 22, the other ends of the passage-ways being in communication with the compartment B as at 23. Thus it will be seen that air from the supply flue 9 enters certain of the radial air spaces and from there passes into the communicating longitudinal air spaces, and thence into the passage-ways 19 from where it finds its way into the compartment B.

The compartment A is also supplied with air from certain other of the radial air spaces which communicate with the longitudinal passage-ways defined by the channel bars 17. In order to compensate for the lack of perforations in the portions 22 of the inner shell 14, the end wall 16 adjacent thereto is provided with a perforated portion 24. The perforated area of the compartments A and B is thus maintained substantially equal and air will enter one with as much facility as the other.

The compartment C is supplied with air in substantially the same manner as the compartment B, the passage-ways 20 being in communication as at 25 with the longitudinal air spaces located at the exhaust end of the apparatus. The opposite ends of both the passage-ways 19 and 20 are closed by means of caps 26, from each of which a thimble valve 27 extends. These valves may be rotated to open or close the communications between the passage-ways 19 and 20 and the several compartments B and C.

The means in the present apparatus for directing the air through the material being treated as in the structure of the patent hereinbefore referred to consists of stationary valves 28 and 29 disposed respectively in the air supply flue 9 and air exhaust flue 10. These valves remain stationary as the malting drum slowly revolves and they are disposed above and below the oblique surface line of the material under treatment.

After the air is directed into the several compartments and passes through the material therein it is exhausted through air conducting passage-ways 30 and 31 from the compartments A and B respectively; the air from the compartment C is expelled through radial air spaces which are in communication with the longitudinal air spaces defined by the channel bars 17 and through perforated portions 32 in the adjacent wall 16. The air conducting passage-ways 30 and 31, the means for connecting the same in communication with the drum, and the manner of controlling the passage of air therethrough is identical with the air delivery passage-ways 19 and 20. In other words one end of the malting drum is constructed in substantially the same manner as the other.

Located centrally of the drum and extending longitudinally throughout the several compartments is a perforated outlet pipe 33, the same being located within the openings 13 in the partition walls 11. Adjacent these partition walls the outlet pipe 33 is divided by partitions 34 and 35, and extending from the first mentioned partition is a discharge tube 36 which opens at the exhaust end of the outlet pipe 33 and within the exhaust flue 10; a similar discharge tube 37 also extends from the partition 35 to the last mentioned end of the outlet pipe. With the aid of this structure some air forced into the compartments A, B and C will find an outlet through the pipe 33. However, the air which enters that portion of the pipe 33 within the compartment A will not be in danger of escape through the wall of the pipe within the other compartments as it is forced to travel through the tube 36. Similarly, the air entering the pipe 33 from the compartment B must necessarily pass through the tube 37. Each of these tubes is provided with a cover 38 which forms a valve therefor. The air which enters the pipe 33 from the compartment C will pass around the tubes 36 and 37 and exhaust through the hollow hub 7 at this end of the drum; this hub may also be provided with a closure for the same purpose as the closures 38.

The air entering the several compartments of the drum will be thoroughly distributed through the mass of material therein as the same will find admittance through the plurality of perforations throughout the lower portion of the inner perforated shell 14. In other words the air will enter the perforated shell thereof of the lower longitudinal air spaces defined by said perforated shell and the outer inclosing shell 1 and the channeled bars 17. This distribution is obtained by perforating each alternate channeled bar 17 as at D. These perforations D will also facilitate the exhaustion of the air through the upper longitudinal air spaces.

From the foregoing description it will be noted that any one of the compartments, or all of them, may be used or not as desired, and the passage of air therein or therefrom readily controlled. Various minor changes may be made in the form and proportion of the several parts of the apparatus without sacrificing any of the advantages thereof, for instance the number and location of the air passageways may be modified.

I claim:—

1. In an apparatus for the treatment of grain and other material, an inclosing shell, a series of transverse partitions in the shell to define a plurality of compartments therein, an air supply flue, means for conducting air from the supply flue to each of the compartments including means for directing the same through the material therein, an exhaust flue connecting with suction means, and means for conducting air from the compartments to said suction exhaust flue.

2. In a rotary pneumatic apparatus for the treatment of grain and other material, an inclosing shell adapted to be rotated and having an opening in its ends, a series of transverse partitions in the shell to procure a plurality of compartments therein, an inner perforated shell having closed ends, radial air spaces between the ends of the shells, longitudinal air spaces establishing communication between the several compartments and the radial air spaces, stationary supply and exhaust flues in communication with the radial air spaces at the opposite ends of the inclosing shell, and stationary valves controlling the opening in said radial air spaces to said flues, said valves being disposed in opposite directions from the line of obliquity of material treated in said apparatus.

3. In an apparatus for the treatment of grain and the like, an inclosing shell, a series of transverse partitions in the shell to define a plurality of compartments therein, an air supply flue, an annular series of air delivery passage-ways extending from the supply flue and opening through the wall of the shell into each compartment, means for directing air from said passage-ways through the material in said shell, an exhaust flue, and means for conducting air from the compartments to said exhaust flue.

4. In an apparatus for the treatment of grain and the like, an inclosing shell, a series of transverse partitions in the shell to define a plurality of compartments therein, an air supply flue, an annular series of air delivery passage-ways extending from the supply flue and opening through the wall of the shell into each compartment, means for directing air from said passage-ways through the material in said shell, an exhaust flue, and an annular series of air discharge passage-ways opening through the wall of the shell into each compartment and extending to the exhaust flue.

5. In an apparatus for the treatment of grain and the like, an inclosing shell, a series of transverse partitions in said shell to define a plurality of compartments therein, an air supply flue, a peripherally disposed series of air passage-ways extending from the supply flue and opening through the wall of the shell into each compartment, means for directing the air from said passage-ways through the material in said shell, an exhaust flue, and a substantially centrally disposed outlet pipe extending through the several compartments and having communication therewith and with said exhaust flue.

6. In an apparatus for the treatment of grain and other material, an inclosing shell, a series of transverse partitions in said shell to define a plurality of compartments therein, an air supply flue, an annular series of air delivery passage-ways extending from the supply flue and opening through the wall of the shell into each compartment, means for directing the air from said passage-ways through the material in said shell, an exhaust flue, an annular series of air discharge passage-ways opening through the wall of the shell into each compartment and extending to said exhaust flue, and a centrally disposed outlet pipe extending from the several compartments and having communication therewith and with said exhaust flue.

7. In an apparatus for the treatment of grain and other material, an inclosing shell, a series of transverse partitions in the shell to define a plurality of compartments therein, an air supply flue, means for conducting air from the supply flue to each of the compartments including means for directing the same through the material therein, an exhaust flue, a centrally disposed outlet pipe extending through the several compartments and having communication therewith, said outlet pipe being divided into a number of sections corresponding to the number of compartments, and an individual discharge tube extending from each of the sections of the outlet pipe to the exhaust flue.

8. In an apparatus for the treatment of grain and other material, an inclosing shell, a series of transverse partitions in the shell to define a plurality of compartments therein, an air supply flue, means for conducting air from the supply flue to each of the compartments including means for directing the same through the material therein, an exhaust flue, a centrally disposed outlet pipe extending through the several compartments and having communication therewith, said outlet pipe being divided into a number of sections corresponding to the number of compartments, and an individual valved discharge tube extending from each of the sections of the outlet pipe to the exhaust flue.

9. In an apparatus for the treatment of grain and other material, an inclosing shell, a series of transverse partitions in the shell to define a plurality of compartments therein, an air supply flue, an annular series of valved air delivery passage-ways extending from the supply flue and opening through the wall of the shell into each compartment, means for directing the air from said passage-ways to the material in said shell, an exhaust flue, and means for conducting air from the compartments to said exhaust flue.

10. In an apparatus for the treatment of grain and other material, an inclosing shell, a series of transverse partitions in the shell to define a plurality of compartments therein, an air supply flue, an annular series of valved delivery passage-ways extending from the supply flue and opening through the wall of the shell into certain of the compartments, whereby the flow of air through any of said passage-ways will be regulated, means for directing the air from said passage-ways through the material in said shell, an exhaust flue, and an annular series of valved air discharge passage-ways opening through the wall of the shell and extending to the exhaust flue whereby the flow of air from any of said passageways may be controlled.

11. In a rotary pneumatic apparatus for the treatment of grain and other material, an inclosing shell adapted to be rotated and having an opening in its ends, a series of transverse partitions in the shell to procure a plurality of compartments therein, an inner perforated shell having closed ends, radial air spaces between the ends of the shells, longitudinally disposed bars positioned between the two shells and extending throughout the length thereof to define longitudinal air spaces, each alternate bar having perforations, said longitudinal air spaces being adapted to establish communication between the radial air spaces and the several compartments, stationary supply and exhaust flues for certain of said compartments in communication with the radial air spaces at the opposite ends of the inclosing shell, and stationary valves controlling the opening in said radial air spaces to said flues, said valves being disposed in opposite directions from the line of obliquity of material treated in said apparatus.

12. An apparatus of the class described including an outer shell, a foraminous drum disposed in the outer shell and having its periphery spaced from the periphery of the shell, a plurality of transverse partitions in the drum defining a plurality of compartments therein, mating partitions between the periphery of the drum and the outer shell and defining a plurality of annular spaces surrounding the foraminous drum compartments, and intake and exhaust fluid ducts communicating with the interiors of the said compartments and with the annular spaces surrounding said compartments.

13. An apparatus of the class described including an outer rotatable shell, a drum having a foraminous peripheral wall disposed within and spaced from the wall of the outer shell, a series of transverse partitions in the drum defining a plurality of compartments therein, mating partitions disposed between the periphery of the drum and the outer shell and defining annular spaces surrounding the said compartments, ducts connecting one portion of the outer shell with other portions of the shell between the mating partitions, ducts communicating with the compartments, and means for setting up flow of air through said compartments, annular spaces and ducts.

In testimony that I claim the foregoing I have hereunto set my hand at Milwaukee, in the county of Milwaukee, and State of Wisconsin.

W. A. PETERMAN.

Copies of this patent may be obtained for five cents each, by addressing the "Commissioner of Patents, Washington, D. C."